US012688713B2

(12) United States Patent
Forzy et al.

(10) Patent No.: US 12,688,713 B2
(45) Date of Patent: Jul. 21, 2026

(54) METHOD FOR DETERMINING A DISTRACTION LEVEL OF A VEHICLE DRIVER

(71) Applicant: RENAULT S.A.S, Boulogne Billancourt (FR)

(72) Inventors: Jean-Francois Forzy, St Remy les Chevreuse (FR); Sabine Langlois, Paris (FR); Michel Leherichon, Paris (FR)

(73) Assignee: AMPERE S.A.S., Boulogne-Billancourt (FR)

( * ) Notice: Subject to any disclaimer, the term of this patent is extended or adjusted under 35 U.S.C. 154(b) by 362 days.

(21) Appl. No.: 18/262,517

(22) PCT Filed: Jan. 10, 2022

(86) PCT No.: PCT/EP2022/050356
§ 371 (c)(1),
(2) Date: Jul. 21, 2023

(87) PCT Pub. No.: WO2022/157026
PCT Pub. Date: Jul. 28, 2022

(65) Prior Publication Data
US 2024/0078821 A1     Mar. 7, 2024

(30) Foreign Application Priority Data

Jan. 22, 2021    (FR) ........................................ 2100606

(51) Int. Cl.
G06V 20/59         (2022.01)
(52) U.S. Cl.
CPC .................................. G06V 20/597 (2022.01)

(58) Field of Classification Search
None
See application file for complete search history.

(56) References Cited

U.S. PATENT DOCUMENTS

| | | | |
|---|---|---|---|
| 2009/0123031 A1* | 5/2009 | Smith .................... | A61B 5/163 348/148 |
| 2014/0225725 A1* | 8/2014 | Takahashi ............ | G06V 20/597 340/439 |
| 2015/0194035 A1 | 7/2015 | Akiva et al. | |

(Continued)

FOREIGN PATENT DOCUMENTS

| | | |
|---|---|---|
| EP | 2 892 036 A1 | 7/2015 |
| GB | 2500690 A | 10/2013 |

OTHER PUBLICATIONS

Fotios, S.—"The effect of distraction, response mode and age on peripheral target detection to inform studies of lighting for driving"—Lighting Res. Technol 2020—pp. 1-20 (Year: 2020).*

(Continued)

*Primary Examiner* — Bernard Krasnic
(74) *Attorney, Agent, or Firm* — Oblon, McClelland, Maier & Neustadt, L.L.P.

(57)         ABSTRACT

A method for determining a distraction level of a driver of a vehicle includes acquiring the direction of the gaze of the driver and maintaining or incrementing or decrementing a counter assessing the distraction level as a function of the acquired direction. The method also includes acquiring an offset level of an item of equipment of the vehicle relative to a reference direction, and at least one feature of the counter is determined as a function of the offset level.

15 Claims, 2 Drawing Sheets

(56) References Cited

U.S. PATENT DOCUMENTS

| | | |
|---|---|---|
| 2018/0075727 A1 | 3/2018 | Akiva et al. |
| 2018/0133507 A1* | 5/2018 | Malchano ............ A61N 5/0622 |
| 2019/0138790 A1 | 5/2019 | Matsumura et al. |
| 2019/0144003 A1 | 5/2019 | Hyuga et al. |
| 2021/0004619 A1 | 1/2021 | Qin et al. |
| 2021/0133469 A1* | 5/2021 | Wang ................... G06V 20/597 |

OTHER PUBLICATIONS

International Search Report Issued May 2, 2022, in PCT/EP2022/050356, filed on Jan. 10, 2022, 2 pages.
French Preliminary Search Report issued Oct. 5, 2021 in FR 2100606, filed on Jan. 22, 2021, 3 pages (with English Translation of Categories of Cited Documents).

\* cited by examiner

METHOD FOR DETERMINING A DISTRACTION LEVEL OF A VEHICLE DRIVER

TECHNICAL FIELD OF THE INVENTION

The present invention generally relates to driving assistance means for vehicles.

More specifically, it relates to a method for determining a visual distraction level of a driver of a vehicle, comprising:

a step of acquiring a zone in which the gaze of the driver is directed; and a step of updating a counter assessing said distraction level, as a function of the acquired zone. This updating involves incrementing or decrementing the counter or keeping the counter at the same value.

The invention has a particularly advantageous application in motor vehicles adapted for driving on roads.

PRIOR ART

Driving a motor vehicle is an activity that requires a high level of attention from the driver.

Sometimes the attention of the driver is reduced for various reasons (another task to be performed, a state of temporary fatigue, a temporary loss of visual acuity, etc.). However, it has been found that driver distraction is the cause of 8% to 16% of accidents, according to a WHO study dating from 2011. For this reason, it is worthwhile determining whether or not the driver is distracted, in order to issue a warning when the distraction level exceeds an acceptable threshold.

Various methods are known to this end.

A first method involves determining, each time the driver shifts their gaze away from the road, the duration during which they are looking at something other than the road. As soon as this duration exceeds a predetermined threshold, the driver is notified by a warning.

The disadvantage of this method is that the threshold proves to be difficult to set, since it is the result of a compromise between safety and assent. Indeed, if it is too high, it will not allow the driver to be warned quickly enough in the event of danger. On the contrary, if it is too low, too many warnings will be issued, meaning that the driver will attempt to deactivate this warning function, to the detriment of their safety. In addition, this method does not allow a loss of concentration to be taken into account that results from incessant toing-and-froing of the gaze of the driver toward a particular direction (for example, toward a screen). However, such toing-and-froing is highly detrimental to the attention of the driver, who will take more and more time to perceive the situation.

A second more precise solution is presented in the document entitled, "Issues related to the driver distraction detection algorithm AttenD", published by Katja Kircher and Christer Ahlström. It involves using a counter with a value that is initially set to two seconds. This counter has a value that decreases when the driver shifts their gaze away from the road and that then increases when the driver shifts their gaze back toward the road. This counter is configured so as to ensure good detection of the attention level of the driver. When the current value of the counter reaches zero, the driver is considered to be too distracted and a warning is issued.

The major disadvantage of this second solution is that it does not take into account numerous parameters that affect the effective lowering of the distraction level of the driver, such that warnings are sometimes issued when the driver is not actually distracted, or vice versa.

PRESENTATION OF THE INVENTION

In order to overcome the aforementioned disadvantage of the prior art, the present invention proposes a method as defined in the introduction, in which, when the gaze of the driver is directed toward a zone in which an item of equipment of the vehicle is located, a step is provided of acquiring an offset level of said item of equipment relative to a reference direction that is fixed relative to the vehicle, and in which at least one feature of said counter is selected as a function of this offset level.

Thus, by virtue of the invention, it is possible to take into account the effect of the position of the items of equipment inside the vehicle (head-up display screen, multimedia screen, interior rear-view mirror) on the attention of the driver. Indeed, when the driver looks, for example, at a screen located in the middle of the dashboard and then their gaze shifts back to the road, they will take more time to return to their usual visual attention level than when they look at the head-up display screen. Unlike a binary approach, quantitatively taking into account the offset actually allows the accuracy of the determined visual distraction level to be improved and thus allows safe driving by augmenting the assessment of the visual behavior of the driver.

Indeed, it is considered that the more the display is offset relative to the reference direction, the more time is required to become reacquainted with the driving scene (after having looked at this screen). It has thus been possible to show that with a limited offset the driver is still able to process the visual information required for safely driving the vehicle. This is notably due to their peripheral vision, which is still able to process certain main driving elements (for example, the illumination of the brake lights of the preceding vehicle) when the observed screen is only slightly offset from the reference direction.

The invention, by proposing to modify the features of the counter as a function of factors such as this offset level, allows the driver to be warned only when necessary.

A further advantage of the invention is that it is simple to implement and does not require significant computing power.

It should be noted herein that the invention essentially relates to visual distraction, which corresponds to a distraction due to the eyes of the driver being shifted away from the driving scene. Therefore, the invention does not mainly relate to distraction in the broadest sense, covering a distraction state in which the driver is not concentrating much on driving but is looking toward the driving scene.

Advantageously, in the acquisition step, provision is made to determine whether the driver is looking toward one of the items of equipment by comparing the zone toward which the gaze of the driver is oriented with vertical and horizontal components of the offset level a associated with each of the items of equipment. This involves detecting whether this zone corresponds to that of one of the items of equipment by comparing the zone toward which the gaze of the driver is oriented with the vertical and horizontal components of the offset level a associated with each of these items of equipment. Furthermore, the item of equipment is movable or fixed.

Further advantageous and non-limiting features of the method according to the invention, taken individually or according to all technically possible combinations, are as follows:

the item of equipment is fixed in the vehicle, the offset level of the item of equipment is known or is computed as a function of a known location of the item of equipment, with the location or the offset level of said item of equipment having been previously stored in a memory of the vehicle, as a function of the arrangement of said vehicle;

the feature of said counter is selected from among a decrementation rate of the counter after the driver has started looking toward said zone and/or a time before decrementing said counter after the driver has started looking toward said zone, and/or a time before re-incrementing said counter after the driver has stopped looking toward said zone;

the vehicle is fitted with at least one first screen for displaying information related to driving the vehicle and at least one second screen for displaying information unrelated to driving the vehicle;

when the gaze of the driver is directed toward a zone in which one of the first and second screens is located, the time before decrementing said counter after the driver has started looking toward said zone is greater if the zone is that of the first screen than if the zone is that of the second screen;

the offset level of said item of equipment is formed by an angle between an average direction of the gaze when the driver observes said item of equipment and the reference direction (the average direction of the gaze when the driver looks at the road);

the time before decrementing said counter is selected so as to be greater than half a second if the offset level is above a threshold, for example, ranging between 20 and 60 degrees, and equal to 0 seconds otherwise;

a step is provided of acquiring a brightness level outside the vehicle, and at least one feature of said counter is a function of said brightness level, with said feature preferably being the incrementation rate of said counter and/or the time before re-incrementing said counter after the driver has stopped looking toward said zone;

a step is provided of acquiring a type of road on which the vehicle moves and at least one feature of said counter is a function of said type, with said feature preferably being the size of said counter;

a step is provided of acquiring a parameter relating to the age of the driver and/or to the possibility of the driver wearing a pair of glasses with progressive power addition lenses, and at least one feature of said counter is a function of said parameter, with said feature preferably being the decrementation rate of the counter after the driver has started looking toward said zone and/or the time before re-incrementing said counter after the driver has stopped looking toward said zone;

a step is provided of acquiring a road traffic level in the environment of the vehicle, and at least one feature of said counter is a function of said road traffic level, with said feature preferably being the size of said counter;

a step is provided of acquiring a meteorological parameter related to the weather in the environment of the vehicle, and at least one feature of said counter is a function of said meteorological parameter, with said feature preferably being the size of said counter;

a step is provided of acquiring a fatigue level and/or an experience level of the driver, and at least one feature of said counter is a function of said fatigue level and/or of the experience level, with said feature preferably being the size of said counter and/or the time before re-incrementing said counter after the driver has stopped looking toward said zone.

Provision can be made for the incrementation and/or decrementation of said counter to follow a polynomial curve with an order that is greater than or equal to one, and preferably greater than or equal to two. It is the precision of the modeling of the variation of the counter used in each zone that will determine the polynomial level that is used.

Of course, the various features, variants and embodiments of the invention may or may not be associated with one another according to various combinations, insofar as they are not incompatible or mutually exclusive.

DETAILED DESCRIPTION OF THE INVENTION

The following description, with reference to the accompanying drawings, which are provided by way of non-limiting examples, will clearly set forth the content of the invention and how it can be produced.

The invention generally relates to a driver driving a vehicle, and more specifically relates to a way of determining whether or not the driver is visually distracted.

"Visual distraction" will be defined herein as a diversion of the visual attention of the driver by an element or an event, which may be unassociated with driving activity, and which occurs to the detriment of the driving activity.

The "distraction level" is then an indicator for assessing, at any time, whether or not the gaze of the driver is distracted from the driving activity.

Figure 1:
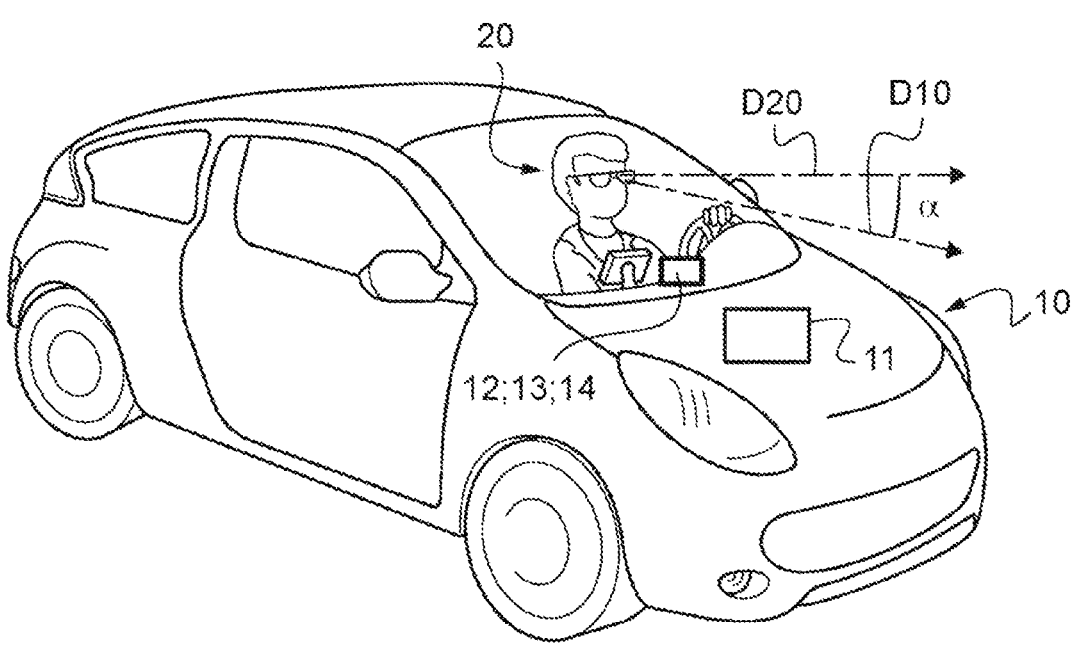
FIG. 1 is a schematic view of a motor vehicle equipped with means for implementing the invention.

FIG. 1 shows a vehicle 10 adapted for implementing a method for determining this distraction level.

In this case, this is a motor vehicle and, more specifically, a car. As a variant, it could be another type of vehicle (truck, motorbike, bicycle, airplane, boat, etc.).

In this case, this vehicle 10 conventionally comprises a passenger compartment, which notably includes a seat for the driver 20 of the vehicle, a dashboard and a steering wheel.

When seated on their seat and looking at the road in front of them (which in this case is considered to be straight), the driver 20 shifts their gaze in a direction, called reference direction D10. In practice, this reference direction D10 is considered to be parallel to the longitudinal axis of the vehicle 10, and oriented toward the front of the vehicle.

When driving, the driver may have to shift their gaze in a direction D20 different from this reference direction D10, notably to look toward an item of equipment of the vehicle.

In this case, this item of equipment is defined as an element for providing the driver with visual information. Preferably, it is an item of equipment that is useful for driving the vehicle or that is useful for controlling any functionalities provided by the vehicle (controlling the volume of the radio, temperature control, etc.).

Throughout the remainder of the description, and by way of a non-limiting illustration, the dashboard will be considered to be equipped with three items of equipment, namely three separate screens.

A first screen, called multimedia screen hereafter, is located at the center of this dashboard. It allows information to be displayed, with at least some of said information not being linked to the driving process. It involves, for example, information related to the air conditioning, to the radio, etc. In this case, this multimedia screen will be considered to be a touchscreen.

A second screen, called an instrumentation screen hereafter, is located behind the steering wheel. It allows information to be displayed, with at least some of said information being linked to the driving process (speed of the vehicle, fuel level, etc.).

A third screen, better known as a Head-Up Display (HUD), is located behind the steering wheel, above the instrumentation screen, at the level of the windscreen. In this case, this screen is transparent so that the driver can see the road through it.

In this case, each of these screens will be considered to be located in a particular zone of the passenger compartment. The same applies for the two exterior rear-view mirrors of the vehicle and for the interior rear-view mirror, which form three other items of equipment within the meaning of the present invention.

Figure 4:
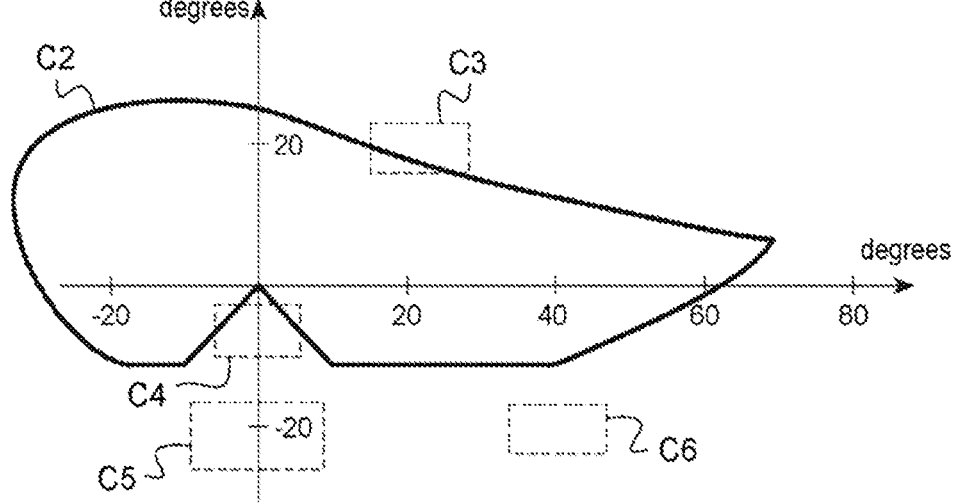
FIG. 4 is a diagram illustrating zones in which the gaze of the driver of the vehicle of FIG. 1 can be directed.

FIG. 4 shows part of these particular zones of the passenger compartment.

Thus, the zone C3 corresponds to the zone in which the interior rear-view mirror is located.

The zone C4 corresponds to the zone in which the head-up display screen is located.

The zone C5 corresponds to the zone in which the instrumentation screen is located.

The zone C6 corresponds to the zone in which the multimedia screen is located.

In FIG. 4, the center of the graph (coordinates 0°, 0°) corresponds to the reference direction D10. The abscissa axis represents the horizontal difference between the direction D20 the driver 20 can look toward and the reference direction D10, in degrees. The ordinate axis represents the vertical difference between the direction D20 and the reference direction D10, also in degrees.

In the description, an angle $\alpha$ can be considered that separates the reference direction D10 from the average direction the driver needs to look toward in order to observe a particular item of equipment of the vehicle. The "offset level" will then be defined as being a measurement of the amplitude of this diversion of the gaze that is required to look in the considered zone. In this case, the offset level is considered to be equal to the aforementioned angle $\alpha$. Therefore, it will be called "offset level $\alpha$" hereafter.

In other words, the zone in which each item of equipment of the vehicle is located can be associated with a known offset level $\alpha$, which depends on the arrangement of the vehicle.

Preferably, this offset level $\alpha$ is defined by its two horizontal $\alpha_{hor}$ and vertical $\alpha_{vert}$ components.

Thus, by way of an example, the zone C4 of the head-up display screen is defined in this case by an offset level $\alpha$ having a zero horizontal component $\alpha_{hor}$ and a vertical component $\alpha_{vert}$ equal to −10 degrees.

The zone C3 of the interior rear-view mirror is defined in this case by an offset level $\alpha$ having a horizontal component $\alpha_{hor}$ equal to 20 degrees and a vertical component $\alpha_{vert}$ equal to 20 degrees.

The vehicle 10 also comprises a computer 11, which comprises a processor, a memory and various input and output interfaces.

By virtue of its input interfaces, the computer 11 is adapted to receive different "input data", which originates from sensors or from third-party electronic devices. It is thus adapted to receive:

an item of information relating to the zone in which the driver 20 is looking, which is acquired by a sensor 12 located in the dashboard and which determines the position of the eyes of the driver;

an ambient brightness level outside the vehicle 10, which is acquired, for example, by a sensor 13 located behind the windshield (as a variant, it could be based on the on or off state of the lights of the vehicle);

a type of road on which the vehicle is moving (for example, selected from among the set including "street", "road" and "motorway"), in this case acquired by means of a navigation system fitted to the vehicle 10;

the age of the driver 20, which is entered by the driver on the multimedia screen;

an indicator indicating whether the driver is wearing glasses including progressive lenses, which is entered by the driver on the multimedia screen;

a road traffic level (for example, selected from among the set including "flowing", "dense" and "gridlock"), acquired, for example, by virtue of a navigation system fitted to the vehicle (as a variant, it could be solely based on the information measured by the vehicle, such as the distance separating the vehicle from the vehicle preceding it);

a meteorological parameter (indicating, for example, the presence or absence of snow and/or rain and/or fog), acquired by a wireless communication means fitted to the vehicle 10 or by virtue of measurement means fitted to the vehicle;

a fatigue level of the driver, measured, for example, by means of a sensor 14 detecting the durations and frequencies of any closure of the eyelids of the driver 20;

an experience level of the driver 20, which is entered by the driver on the multimedia screen;

the speed of the motor vehicle, measured by a sensor located on one of the axles of the vehicle 10;

the angle of the vehicle relative to the road and/or the difference between the vehicle and the edge of the lane;

the duration before collision, i.e., the time required to hit the car preceding the vehicle 10, given the position and the speed of this car, which are measured by a sensor (for example, RADAR or camera) located at the front of the vehicle.

It should be noted that this data, hereafter called "input data", can be conveyed over a CAN network of the vehicle and be read by the computer 11.

By virtue of its output interfaces, the computer 11 is adapted for controlling a human-machine interface in order to provide the driver with information. This interface comprises, for example, one of the three aforementioned screens and/or enclosures located in the passenger compartment of the vehicle and/or a haptic interface (for example, a vibration means located in the driver seat or in the steering wheel).

By virtue of its memory, the computer stores a computer application, made up of computer programs comprising instructions, the execution of which by the processor allows the computer to implement the method described hereafter.

The computer 11 is thus programmed to determine the instantaneous visual distraction level of the driver by acquiring the aforementioned input data, by configuring a counter designed to assess this distraction level and then by computing the instantaneous value of this counter.

The configuration is completed as a function of the values of at least some of the acquired input data (namely at least as a function of the zone toward which the driver is looking).

For its part, computing involves incrementing or decrementing the counter or keeping the counter constant. Thus, computing is based on a function that is defined for each zone that is looked toward (therefore, this function varies from one zone to the next) and that will algebraically vary the value of the counter.

Figure 2:
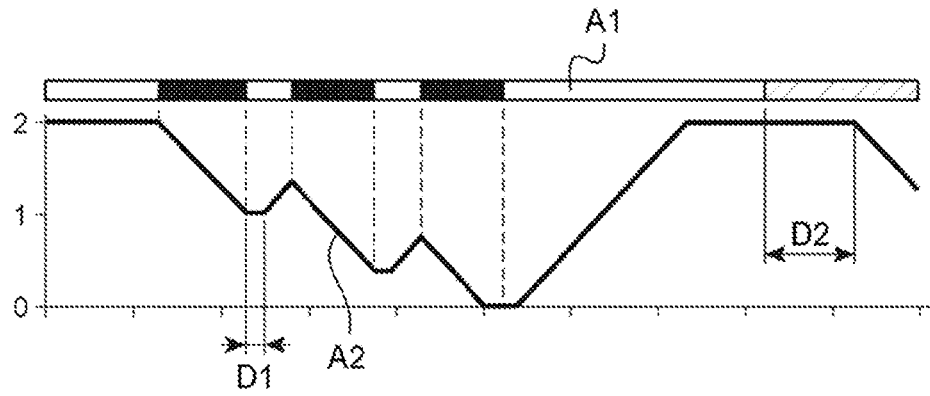
FIG. 2 is a graph illustrating a first example of a variation of a counter according to the invention as a function of time.

The curve A2 in FIG. 2 illustrates an example of a variation in the value of the counter. As shown in this figure, the counter varies continuously.

In this case, this counter is a time counter, i.e., a kind of hourglass that empties when the driver appears distracted and that can be turned over when they are attentive.

This counter has a minimum limit $B_{min}$, in this case shown in FIG. 2 as being equal to zero. In this case, it further comprises a maximum limit that defines the size of the counter. This maximum limit $B_{max}$ ranges between 1 and 10 seconds, and preferably between 1.5 and 7 seconds. In this case, it is shown in FIG. 2 as being equal to 2 seconds.

Each time the driver shifts their gaze from the road (which is illustrated in field A1 of FIG. 2 by black or shaded zones), this counter is decremented. However, when the gaze of the driver returns to the road (white zones in field A1 of FIG. 2), this counter is incremented.

Throughout the remainder of this disclosure, the driver will be considered to be shifting their gaze away from the road as soon as they look toward one of the predefined zones (i.e., toward one of the zones where an item of equipment of the vehicle is located). In the case of a fixed item of equipment in the vehicle, the predefined zones depend on the arrangement of the vehicle, i.e., the positioning of the fixed items of equipment in the passenger compartment of the vehicle.

According to a first variant, the driver could be considered to be shifting their gaze away from the road as soon as the offset level α (or at least one of its components) of the zone toward which they are looking exceeds a predetermined threshold. For example, a first threshold can be defined for the horizontal component $\alpha_{hor}$ (preferably ranging between 5 and 40 degrees, in this case selected as being equal to 10 degrees) and a second threshold for the vertical component $\alpha_{vert}$ (preferably ranging between 3 and 10 degrees, in this case selected as being equal to 5 degrees), beyond each of which thresholds the driver will be considered to be shifting their gaze away from the road. The values of the first threshold and of the second threshold can be identical or different.

According to a second variant, it is possible to more precisely measure whether or not the driver shifts their gaze away from the road. Thus, it would be possible to consider that the driver shifts their gaze away from the road as soon as they look in a zone distinct from a predefined zone (illustrated, for example, by the curve C2 of FIG. 4).

At this stage, it should be noted that, irrespective of the contemplated embodiment, no precise detection of the direction of the gaze is required. On the contrary, generally knowing the zone the driver is looking toward is sufficient.

In the case of a mobile item of equipment, for example, a mobile telephone of the driver, the zones are not predefined as a function of the arrangement of the fixed items of equipment of the vehicle. The front passenger compartment of the vehicle is divided, for example, into a plurality of zones characterized by their geographical position relative to the head of the driver: left, center, right, top, bottom. For example, a mobile telephone resting on the knees of the driver is located in a zone at the bottom center relative to the head of the driver. The location of a mobile item of equipment in the vehicle is determined, for example, using a camera or as a function of the transmission of a signal of said mobile item of equipment. The offset level (α) of the mobile item of equipment is determined, for example, on the basis of an acquisition of the direction of the gaze of the driver by a sensor such as a camera or in a less precise manner as a function of the geographical position of the zone in which the mobile item of equipment is located relative to the zone in which the head of the driver is located.

Please refer to FIG. 2 for a description of how to configure the counter.

As shown by the curve A2 of FIG. 2, provision is made to decrement the counter when the driver shifts their gaze from the road, directly or after a determined time (depending on the zone toward which they are looking). Provision is also made to increment the counter when the gaze of the driver returns to the road, after a determined time. Provision is made to keep the counter constant in the following cases:
   when the gaze of the driver is oriented toward the road and its value is equal to the maximum limit $B_{max}$;
   when the gaze of the driver is shifted away from the road and its value is equal to the minimum limit $B_{min}$;
   when the driver returns their gaze to the road, for a short duration (called "return time D1"); and
   under certain conditions, when the driver shifts their gaze away from the road, for a slightly longer duration (called "shifted time D2").

The conditions in which this return time D2 is selected as being non-zero will be described in detail hereafter.

In FIG. 2, each incrementation follows an affine function in the form $y=V_I·x+b$. In the same way, each decrementation follows an affine function in the form $y=V_D·x+b$. In these equations, the parameters $V_I$ and $V_D$ respectively form incrementation and decrementation rates of the counter.

Figure 3:
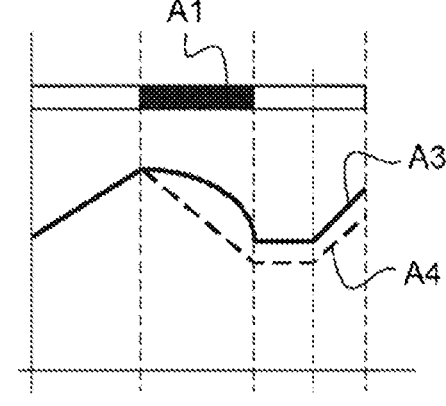
FIG. 3 is a graph illustrating a second example of a variation of the counter as a function of time.

As will become apparent throughout the remainder of this disclosure, with reference to FIG. 3, the incrementations and decrementations can follow non-affine curves A3, for example polynomial curves with an order greater than or equal to two.

The parameters referenced $B_{min}$, $B_{max}$, $V_I$, $V_D$, D1 and D2 are those which, in the example shown, allow the variations of the counter to be influenced in order to best assess the distraction level of the driver. In other words, they will allow the variations of the counter to be configured taking into account the input data.

In this case, these parameters have nominal values which, according to the invention, can be adjusted as a function of the input data in order to best assess the distraction level of the driver.

By way of an example, these nominal values are:
$B_{min}$=0 s;
$B_{max}$=2 s;
$V_I$=1;
$V_D$=−1;
D1=0.1 s;
D2=0 s.

The parameters $B_{min}$, $B_{max}$, $V_I$, $V_D$, D1 and D2 used for each zone C3, C4, C5, C6 then can be adjusted.

Throughout the remainder of this disclosure, two parts will be used to explain how to act upon these six parameters in order to compute a distraction level that is the most consistent with reality, taking into account not only the zone toward which the gaze of the driver is oriented, but also other input data.

In the first part, the input data will be considered in an isolated manner, by explaining how they allow prior values to be determined for the aforementioned parameters $B_{min}$, $B_{max}$, $V_I$, $V_D$, D1, D2.

In the second part, based on an example, it will be possible to describe how these prior values can be combined in order to configure the counter.

The input data can be classified into three large families (or "categories").

The first family includes the input data relating to the driver themselves (age, experience, fatigue, wearing glasses with progressive lenses).

The second family in this case includes a single input datum that relates to the vehicle and to its arrangement (namely, the offset).

The third family includes the input data relating to the environment of the vehicle (brightness, road type, traffic, weather).

It is then possible to explain how each input datum can influence the configuration of the counter.

The age of the driver and/or the fact that they wear a pair of glasses with progressive lenses is therefore a first input datum, by means of which the computer 11 will be able to configure the counter. More specifically, this input datum will allow a modeling function to be configured that will then be used to compute the value of the counter.

To this end, two cases can be considered.

The first case is that in which the age of the driver is below a predetermined threshold (for example, 50 years) and in which the driver does not wear glasses with progressive lenses. In this case, the nominal values of the parameters of the counter are considered.

Otherwise, the prior value $V_{D, age}$ of the decrementation rate $V_D$ is selected so as to be less than –1 (preferably ranging between –1.2 and –1.8). In this case, this prior value $V_{D, age}$ is selected so as to be equal to –1.2. This value allows the counter to be decreased more quickly in order to take into account the fact that the eyes of an elderly person or of a person wearing glasses with progressive lenses will take more time to accommodate in order to transition from long-distance vision to short-distance vision, and vice versa.

As a variant, as shown in FIG. 3, instead of selecting a decrementation rate $V_D$ of less than –1 (which is illustrated by the curve A4), the decrementation of the counter could be configured by means of a polynomial function with an order that is greater than or equal to two (illustrated by the curve A3). Thus, if the driver is elderly or wears glasses with progressive lenses, provision can be made for the counter to decrease increasingly quickly.

It should be noted that, in this FIG. 3, the curves shown are only valid if the observed zone is that of the head-up display screen. It can be seen that the curve A3 initially decreases slower than the curve A4, which is valid because this screen leaves space to view the road. As a result, it initially has little influence on the level of visual attention. However, this influence increases progressively over time since the driver risks excessively focusing their attention thereon if their gaze does not return to the road.

In addition, particular cases can be provided.

For example, if the driver is elderly and shifts their gaze away from the road in order to view the multimedia screen or the instrumentation screen, the prior value $D1_{age}$ of the shifted time D1 can be selected so as to be strictly greater than 0.1 s (for example, ranging between 0.12 and 0.18 s). In this case, this prior value $D1_{age}$ is selected so as to be equal to 0.15 s. As a variant, this value may not be fixed, but may be a function of the age of the driver (or of the addition of progressive lenses). In this case, the notion is to again take into account the fact that the accommodation of the eyes of a young person is faster than that of the eyes of an elderly person or of a person wearing progressive lenses and/or because cognitive functions can alter with age, with an elderly driver taking more time, after shifting their gaze, to become reacquainted with their bearings on the road.

The state of fatigue of the driver is a second input datum, by virtue of which the computer 11 will be able to configure the counter.

More specifically, this input datum will also allow a modeling function to be configured, which will then be used to compute the value of the counter.

By way of an example, two cases can be considered.

If the driver is considered to be alert, the nominal values of the parameters are considered.

Otherwise, i.e., if the fatigue of the driver exceeds a predetermined threshold, the size of the counter is reduced, for example, by giving a non-zero prior value $B_{min,fatigue}$ to its minimum limit $B_{min}$. This value can be a function of the level of fatigue of the driver. In this case, this prior value $B_{min,fatigue}$ is selected so as to be equal to 0.2 s.

Thus modifying the size of the counter allows a warning to be issued more quickly when the driver is tired, in order to take into account the fact that distraction and fatigue have dangerously accumulated.

It should be noted in this case that modifying the value of the minimum limit rather than that of the maximum limit is of particular interest since this allows the functions that are used to be acted upon (for example, the offset b of an affine function of the type y=a·x+b) and therefore allows the future operating mode of the warnings to be influenced.

The experience of the driver is a third input datum, by virtue of which the computer 11 can configure the counter. In this case again, and as for the other considered input data, this input datum will allow a modeling function to be configured that will then be used to compute the value of the counter. By way of an example, two cases can be considered.

If the driver is considered to be experienced (namely, for example, with more than 3 years of experience), the nominal values of the parameters are considered.

Otherwise, the prior value $D1_{exp}$ of the shifted time D1 can be selected so as to be greater than 0.1 second. This value then preferably ranges between 0.11 and 0.15 s. In this case, it is set to 0.12 s. As a variant, it could be adjusted as a function of the experience.

Thus, a driver with limited experience will be required to be more alert than an experienced driver, so as to compensate for the fact that they do not yet necessarily have all the right driving reflexes.

As has been introduced above, the offset level α (or its two components $a_{hor}$ and $\alpha_{vert}$) is a fourth input datum, by virtue of which the computer 11 will configure the counter.

In order to take into account this input datum, provision is made to generally determine the zone toward which the driver 20 is looking and then to detect whether this zone corresponds to that of one of the considered items of equipment (screen or rear-view mirror). This detection is carried out by comparing the zone toward which the gaze of the driver is oriented with the vertical and horizontal components of the offset level α associated with each of these items of equipment.

In order to explain how this input datum is taken into account in the configuration of the counter, several cases can be considered.

The first case is that in which the driver shifts their gaze from the road in order to look at one of the items of equipment, in a direction D20 spaced apart by less than 40 degrees from the reference direction D10. In this case, the nominal values of the parameters are considered.

Otherwise, the prior value $D1_\alpha$ of the decrementation rate $V_D$ can be selected so as to be strictly less than −1. In addition, or as a variant, the prior value $D2_\alpha$ of the shifted time D2 can be selected so as to be equal to 0 s, while the prior value $D1_\alpha$ of the return time D1 can be selected so as to be strictly greater than 0.1 s.

In practice, these prior values $D1_\alpha$, $V_{D\alpha}$ can be selected as a function of the value of the offset coefficient $\alpha$.

By way of an example, when the offset level $\alpha$ is greater than 40 degrees, these prior values can be computed as follows:

$$D1_\alpha = \frac{0.1.(1 + \alpha)}{\alpha} \qquad \text{[Math. 1]}$$

$$VD_\alpha = \frac{1 + \alpha}{\alpha} \qquad \text{[Math. 2]}$$

The advantage of this solution is to take into account the fact that the more the driver will shift their gaze from the reference direction D10, the more time they will take to find their bearings when their gaze returns to being fixed on the road.

Another major advantage is that the greater the offset of the observed item of equipment, the less able the peripheral vision of the driver is to perceive what happens on the road in order, if appropriate, to draw their gaze (more specifically the central vision) back to the road again.

It is also possible to provide particular cases in this case.

The first particular case then involves the driver looking at the head-up display screen (zone C4 in FIG. 4). It is then possible to consider that their attention hardly drops when they look in this direction.

In this case, in order to take into account the limited accommodation necessary to read the information displayed therein and the limited offset of this screen relative to the reference direction D10, the computer selects a prior value $V_{DHUD}$ of the decrementation rate $V_D$ that is strictly greater than −1, so as to slow down the reduction of the counter. As a variant, a polynomial function could be used to the same end (as has been explained above with reference to FIG. 3). Moreover, the computer selects a prior value $D2_{HUD}$ of the shifted time D2 that is strictly greater than 0.5 s and that is equal to 0.7 second, for example.

The second particular case involves the driver looking at the zone of the instrumentation screen or that of a rear-view mirror. In this case, in order to take into account the fact that the driver looks at this screen or this rear-view mirror to assist with driving the vehicle 10, the computer selects a prior value $D2_{screen}$ of the shifted time D2 that is strictly greater than 0.2 s and that is equal to 0.5 second, for example.

The third particular case involves the driver looking at the zone of the multimedia screen. In this case, in order to take into account the fact that the driver looks at this screen (which is not considered to be an activity directly linked to driving the vehicle 10), the computer selects a prior value $D2_{screen}$ of the shifted time D2 that is strictly less than 0.2 s and that is equal to 0 second, for example.

The external brightness level is a fifth input datum, by virtue of which the computer 11 will configure the counter.

When it is nighttime, or the driver is dazzled, or more generally when the traffic conditions are degraded due to the external brightness, any distraction of the driver will require more time for the driver to become fully reacquainted with the driving conditions.

In order to use this input datum for configuring the counter, the computer 11 considers two cases.

If the brightness level ranges between two limits (which amounts to considering that the daytime driving conditions are optimal for driving the vehicle), the nominal values of the parameters of the counter are considered.

Otherwise, and notably if the brightness level is below a predetermined threshold (which corresponds to nighttime or foggy conditions), the prior value $V_{D,lum}$ of the decrementation rate $V_D$ is set so as to be strictly less than −1 (preferably between −1.2 and −2) and the prior value $V_{I,lum}$ of the incrementation rate $V_I$ is set so as to be strictly less than 1 (preferably between 0.5 and 0.9). This means that it is possible to take into account not only the fact that the driver must adapt to the brightness of the object toward which they have shifted their gaze, but also that they must then re-adapt to the brightness of the road when their gaze returns to the road.

By way of an example, if the brightness is such that it triggers the automatic illumination of the lights of the vehicle and if the road is illuminated by street lights, the prior value $V_{D,lum}$ of the decrementation rate $V_D$ is set to −1.2 and the prior value $V_{I,lum}$ of the incrementation rate $V_I$ is set to 0.8.

However, if the brightness is such that it triggers the automatic illumination of the lights of the vehicle and if the road is not illuminated by street lights, the prior value $V_{D,lum}$ of the decrementation rate $V_D$ is set to −1.5 and the prior value $V_{I,lum}$ of the incrementation rate is set to 0.7.

As a variant, polynomial functions with an order that is greater than or equal to two could be used for the same end.

Additionally, or as a variant, the return time D1 can be set to a prior value $D1_{lum}$ that is strictly greater than 0.1 s, which will be even greater the lower the external brightness (in the case of low brightness). By way of an example, the prior value $D1_{lum}$ can be selected so as to be equal to 0.12 s when the brightness is such that it triggers the automatic illumination of the lights of the vehicle.

At this stage, it should be noted that the most interesting case is that which involves distinguishing daytime driving from nighttime driving since night vision requires more visual attention on the road, such that there is a greater impact of visual distraction at night. In this case, a sensor is not necessary for determining the brightness level because it can be deduced, for example, as a function of the time and the date of the day.

The type of road on which the vehicle 10 is moving is a sixth input datum, by virtue of which the computer 11 can configure the counter.

Three cases can be considered to explain how this sixth input datum can be used.

If the type of road is a "street", which means that the vehicle is moving in a city and requires high concentration from the driver, the size of the counter is reduced, for example, by giving the prior value $B_{max,type}$ of its maximum limit $B_{max}$ a value that is strictly less than 2 seconds.

If the type of road is a "road", the nominal values of the parameters of the counter can be used.

If the type of road is a "motorway", the size of the counter is increased, for example by giving the prior value $B_{max,type}$ of its maximum limit $B_{max}$ a value that is strictly greater than 2 seconds.

The state of the traffic around the vehicle 10 is a seventh input datum, by virtue of which the computer 11 can configure the counter.

By way of an example of the use of this input datum, two cases can be considered.

If the speed of the vehicle 10 is greater than a predetermined threshold, if the travel time between the vehicle 10 and the preceding vehicle is below a predetermined threshold and/or if the traffic is dense, the size of the counter can be reduced by the computer 11, for example by giving a non-zero prior value $B_{min,traffic}$ to its minimum limit $B_{min}$ and/or by reducing the value of its maximum limit $B_{max}$.

Otherwise, the nominal values will be used.

The advantage of modifying the size of the counter is that a warning will be issued more quickly when the traffic is such that the traffic conditions are dangerous.

The weather is an eighth input datum, by virtue of which the computer 11 can configure the counter.

By way of an illustrative example, two cases can be considered.

If the weather is conducive to safe driving, the nominal values of the parameters are unchanged.

Otherwise, i.e. in the event of rain, snow or fog, the size of the counter is reduced, for example by giving a non-zero prior value $B_{min,weather}$ to its minimum limit $B_{min}$ or by reducing the value of its maximum limit $B_{max}$.

The advantage of modifying the size of the counter is that a warning will be issued more quickly when the weather is degraded, in order to take into account the fact that driving the vehicle is more dangerous under these conditions.

Other input data not described herein could be used.

To summarize, it should be noted that the counter will be set by acting:

upon the variation rates when the peripheral vision of the driver is affected;

upon the size of the counter if the reaction time of the driver is affected; and upon the times D1 and D2 otherwise.

At this stage, the computer will have to combine the prior values determined above in order to configure the counter in the desired manner.

To this end, provision could be made for, when multiple input data indicating a distraction issue for the driver accumulate, the computer to select, from among the prior values, those which are the most restrictive (i.e. which have the greatest tendency to quickly reduce the counter).

However, in this case, the computer will proceed otherwise.

More specifically, since shifted or return times are involved, it will consider the most restrictive. With respect to the incrementation or decrementation rates, it will combine their values using a combinatorial function (of the type $F=f_1 \cdot f_2 \cdot \ldots \cdot f_n$).

A particular example can be considered in order to clearly illustrate this.

In this example, the driver is 61 years old, they are wearing glasses with progressive lenses, and they are driving at night on a road illuminated by street lights, with little traffic.

It is then possible to consider the case where:

initially, the counter has a maximum value; then the driver consults an offset screen for 1.5 s, such that when looking at the screen, the offset level $\alpha$ is 46 degrees; and, finally the driver shifts their gaze back toward the road.

These various input data will then allow the various parameters to be computed that are involved in configuring the counter.

Due to the offset level $\alpha$, the prior value $D1_\alpha$ of the return time D1 is set to 0.12 s and the prior value $D2_\alpha$ of the shifted time D2 is set to 0 s.

During the first half-second, the prior value $VD\alpha$ of the decrementation rate VD is set to −1.15. Then, during the next second, it is set to −1.18.

This value of −1.15 is computed as a function of the offset level $\alpha$ (which in this example is equal to 46 degrees) by virtue of the equation $1+(\alpha-40)/40$. After 0.5 s, in the polynomial version of the algorithm provided by way of an example, the distraction is considered to be augmented by 20%, which allows the value of −1.38 to be reached. This augmentation of 20% is due to the fact that after 0.5 s, it becomes likely that the driving scene may have changed.

Due to fluid traffic, the prior value $B_{max,traffic}$ of the maximum limit $B_{max}$ is 5 seconds.

Given the favorable weather, the prior value $B_{max,weather}$ of the maximum limit $B_{max}$ is 5 seconds.

Due to the type of road that is taken, the prior value $B_{max,type}$ of the maximum limit $B_{max}$ is 5 seconds.

The brightness is such that the prior value $V_{D,lum}$ of the decrementation rate $V_D$ is selected so as to be equal to −1.2, while the prior value $V_{I,lum}$ of the incrementation rate $V_I$ is set so as to be equal to 0.8. Moreover, the prior value $D1_{lum}$ of the return time D1 is set to 0.12 s.

Given the experience of the driver, the prior value $D1_{exp}$ of the return time D1 is set to 0.1 s.

Since the driver is elderly and has progressive lenses fitted, the prior value $V_{D,age}$ of the decrementation rate $V_D$ is set to −1.2 and the prior value $D1_{age}$ of the return time D1 is set to 0.15 s.

Consequently, the prior values of the decrementation rate are combined by a multiplication operation. It is therefore possible to write:

$V_D$=−1.15; 1.2; 1.2 during the first half-second; and $V_D$=−1.38; 1.2; 1.2 during the next second.

The prior values of the incrementation rate are combined by a multiplication operation. In this case, the incrementation rate $V_I$ is acquired so as to be equal to 0.8.

The prior values of the return time D1 are combined by a maximum operator. It is therefore possible to write: D1=max (0.1; 0.12; 0.12; 0.15).

The prior values of the maximum limit $B_{max}$ are combined by a minimum operator. It is therefore possible to write: $B_{max}$=min (5; 5; 5).

By virtue of these values, it is possible to configure the counter, then to vary its value at each instant so that it assesses the level of attention of the driver with good acuity.

When the value of this counter reaches zero, the computer 11 is programmed to issue a warning signal.

This warning signal is designed to be adapted to the situation.

In this case, this warning signal can involve controlling a warning message on one of the screens, in the form of a text or an icon. As a variant or in addition, it can involve issuing a sound or a voice message. As a variant or in addition, it can involve activating a vibration in the steering wheel or in the seat of the driver.

The warning signal can have an intensity and/or a length that depends on the number of warning signals already previously transmitted, for example, in the previous hour or since the start of the journey.

Preferably, the computer will be able to emit another type of warning signal, at the end of the journey. This type of warning signal will allow the driver to be informed of their level of attention throughout the entire journey. This can be a number indicating the number of times the driver has been distracted. This number can be compared with the numbers computed for the previous journeys, so that the driver can be made aware of any progress.

The computer can also issue recommendations in the form of text or in voice form, for example: "we recommend that you regularly shift your eyes back to the road for at least 3 seconds to be fully reacquainted with the circumstances around you".

The present invention is by no means limited to the embodiment described and shown, but a person skilled in the art will know how to apply thereto any variant according to the invention.

In particular, provision could be made for the parameters of the counter to be a function of the frequency that the eyes of the driver are shifted away from the road. Indeed, the faster this frequency, the more time is required to allow the driver to become fully aware of their environment. Then, the greater this frequency, the more the incrementation and/or decrementation rates and/or the size of the counter can be reduced. As a variant or in addition, it is also possible to lengthen the shifted time D1 and/or to reduce the return time D2.

According to another variant of the invention, provision could have been made so that the zones do not cover each item of equipment, but that several screens are located in the same zone.

The invention claimed is:

1. A method for determining a visual distraction level of a driver of a vehicle, comprising:

acquiring a zone in which a gaze of the driver is directed;

maintaining or incrementing or decrementing a counter assessing said distraction level, as a function of the acquired zone;

acquiring, when the gaze of the driver is directed toward a zone in which an item of equipment of the vehicle is located, an offset level of said item of equipment relative to a reference direction that is fixed relative to the vehicle, said offset level providing an amplitude of a diversion of the gaze of the driver that is required to look in the zone of said item of equipment and at least one feature of said counter is a function of said offset level;

acquiring a brightness level outside the vehicle, wherein the at least one feature of said counter is selected from among:

a decrementation rate of the counter after the driver has started looking toward said zone;

a time before decrementing said counter after the driver has started looking toward said zone; and a time before re-incrementing said counter after the driver has stopped looking toward said zone, and wherein the at least one feature of the counter is a function of said brightness level and is the decrementation rate of said counter.

2. The determination method as claimed in claim 1, wherein the item of equipment is fixed in the vehicle, with the offset level of the item of equipment being known or computed as a function of a known location of the item of equipment, with the location or the offset level of said item of equipment having been previously stored in a memory of the vehicle, as a function of an arrangement of said vehicle.

3. The determination method as claimed in claim 1, wherein, with the offset level of said item of equipment being formed by an angle between an average direction of the gaze when the driver observes said item of equipment and the reference direction, the time before decrementing said counter is selected so as to be greater than half a second when the offset level is above a threshold and equal to 0 seconds otherwise.

4. The determination method as claimed in claim 3, wherein said threshold is between 20 and 60 degrees.

5. The determination method as claimed in claim 1, further comprising acquiring a parameter relating to an age of the driver or to a possibility of the driver wearing a pair of glasses with progressive power addition lenses, wherein at least one feature of said counter is further a function of said parameter.

6. The determination method as claimed in claim 5, wherein said at least one feature of said counter that is further the function of said parameter is the decrementation rate of the counter after the driver has started looking toward said zone or the time before re-incrementing said counter after the driver has stopped looking toward said zone.

7. The determination method as claimed in claim 1, further comprising acquiring a fatigue level or an experience level of the driver, wherein at least one feature of said counter is further a function of said fatigue level or of the experience level.

8. The determination method as claimed in claim 7, wherein said at least one feature of said counter that is further the function of said fatigue level or of the experience level is a size of said counter or the time before re-incrementing said counter after the driver has stopped looking toward said zone.

9. The determination method as claimed in claim 1, further comprising acquiring a type of road on which the vehicle moves, wherein at least one feature of said counter is further a function of said type of road.

10. The determination method as claimed in claim 9, wherein said at least one feature of said counter that is further the function of said type of road being a size of said counter.

11. The determination method as claimed in claim 1, further comprising acquiring a road traffic level in an environment of the vehicle, wherein at least one feature of said counter is further a function of said road traffic level.

12. The determination method as claimed in claim 11, wherein said at least one feature of said counter that is further the function of said road traffic level is a size of said counter.

13. The determination method as claimed in claim 1, further comprising acquiring a meteorological parameter related to weather in an environment of the vehicle, wherein at least one feature of said counter is further a function of said meteorological parameter.

14. The determination method as claimed in claim 13, wherein said at least one feature of said counter that is further the function of said meteorological parameter is a size of said counter.

15. A method for determining a visual distraction level of a driver of a vehicle, comprising:

acquiring a zone in which a gaze of the driver is directed;

maintaining or incrementing or decrementing a counter assessing said distraction level, as a function of the acquired zone;

acquiring, when the gaze of the driver is directed toward a zone in which an item of equipment of the vehicle is located, an offset level of said item of equipment relative to a reference direction that is fixed relative to the vehicle, said offset level providing an amplitude of a diversion of the gaze of the driver that is required to look in the zone of said item of equipment and at least one feature of said counter is a function of said offset level;

acquiring a parameter relating to a possibility of the driver wearing a pair of glasses with progressive power addition lenses, wherein the at least one feature of said counter is selected from among:

a decrementation rate of the counter after the driver has started looking toward said zone;

a time before decrementing said counter after the driver has started looking toward said zone; and a time before re-incrementing said counter after the driver has stopped looking toward said zone, and wherein the at least one feature of the counter is a function of said parameter and is the decrementation rate of said counter after the driver has started looking toward said zone.

* * * * *